United States Patent Office.

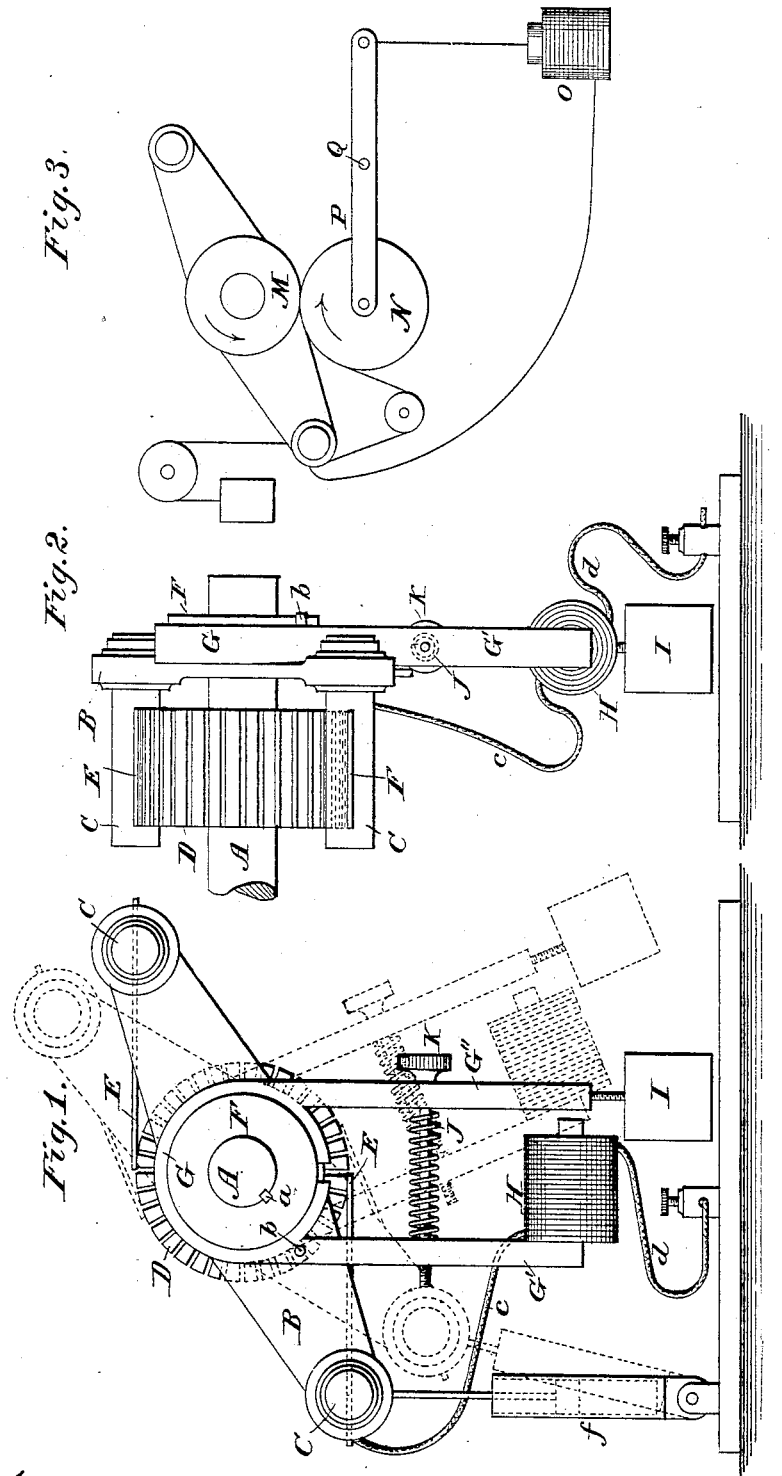

FORÉE BAIN, OF CHICAGO, ILLINOIS, ASSIGNOR TO THE BAIN ELECTRIC COMPANY, OF SAME PLACE.

REGULATOR FOR DYNAMO OR MAGNETO ELECTRIC MACHINES.

SPECIFICATION forming part of Letters Patent No. 291,566, dated January 8, 1884.

Application filed September 21, 1883. (No model.)

*To all whom it may concern:*

Be it known that I, FORÉE BAIN, a citizen of the United States, and a resident of Chicago, Cook county, Illinois, have invented certain new and useful Improvements in Regulators for Dynamo or Magneto Electric Machines or Generators, of which the following is a specification.

My invention relates to regulators for dynamo or magneto electric machines or generators, and has for its object to regulate or govern the current produced by such generators, so that the proper relations may be maintained between the amount of work done in the external circuit of the machine and the amount of current generated and sent to the working-circuit, whereby the greatest amount of electric energy may be developed and utilized for the amount of mechanical force exerted to drive the generator. The regulation may be instantaneous, and the necessary devices or mechanism for producing these results may be simple and inexpensive.

To these ends my invention consists in a regulator wherein the brushes are automatically adjusted, and this automatic adjustment is the resultant of two forces—the first or prime force, which performs the greater portion of the work, being mechanical, as that which drives the machine or rotates the armature, and the secondary force, which performs the minor portion of the work, being electrical, as the current in the external circuit or a branch therefrom. This resultant action is so dependent upon the two forces that produce it that variations in either will cause the regulator to operate properly to maintain the desired condition in the current utilized. Thus, if the speed of the armature or field-magnets, as the case may be, varies on account of the variations in the primary force driving it, this variation will automatically modify the resultant action that controls the regulator in proportion to the variations of speed; and if changes occur in the current in the external or working circuit these changes will automatically modify the resultant action that controls the regulator in accordance with the changes of the current.

In carrying out my invention I provide the shaft of the revolving armature or magnet with a friction-disk rigidly secured thereto. Upon the disk, and nearly surrounding it, is a yoke of soft iron, the ends of which are elongated, and one of them is bent at right angles toward the other. Proper means are supplied for producing the necessary or desired initial pressure of the yoke upon the friction-disk and for regulating the initial distance of one arm from another. One end of the yoke is provided with a weight or spring, which tends to hold the yoke in its normal position and operates in opposition to the friction-disk upon the armature-shaft, which latter tends to carry the yoke around with itself in proportion to the friction between the disk and yoke, the velocity of rotation, &c. Upon the bent portion of the other end of the yoke is a coil of wire connected directly or by a branch with the main working-circuit of the machine. To the yoke is secured the brush-holder in such a position that when the yoke is in its normal condition the brushes will receive the maximum amount of current generated. A dash-pot or other retarding device may be attached to the brush-holder to prevent too sudden movements. From this construction it will be seen that the regulation of the position of the brushes upon the commutator, and consequently the amount of current taken off from the armature, is controlled automatically and depends upon two forces—the prime or maximum one, being the friction between the revolving disk upon the armature-shaft and the yoke resting thereon—and this is a mechanical force and acts directly upon the prime mover of the generator—and the secondary force depends upon the condition of the current in the working-circuit, which tends to clamp the yoke more or less, thereby varying the amount of friction between the yoke and disk, according to the variations in the working-circuit, and causing the prime or mechanical force to move the brushes in accordance therewith. In this manner I cause the mechanical force that drives the machine to do the bulk of the work of regulating the machine, and use the current generated merely to control this mechanical force in a most delicate and simple manner.

But to more particularly describe my invention reference is made to the accompanying drawings, forming part of this specification, in which—

Figure 1 is an end view of my regulating device as applied to an ordinary Gramme commutator. Fig. 2 is a side view of the same, some parts being omitted for the sake of clearness; and Fig. 3 is a modification.

Upon the shaft A of the generator is loosely supported the ordinary brush-holder, B, provided with the insulated studs C C, to which the brushes E E are secured, and which bear upon the commutator D, fixed upon the shaft A in the usual manner. Also, upon the shaft A is tightly secured a friction-disk, F, by means of a key, $a$. Nearly surrounding this disk is a soft-iron yoke, G, the ends or prongs G' G'' of which are elongated and extend below the shaft. One of the ends, as G', is bent at right angles, so as to extend toward and into proximity to the other end or prong, G''. Upon the bent end of the yoke is secured a coil of insulated wire, H, connected to or forming part of the external circuit of the machine. To the end of the other prong, G'', which acts as an armature to the magnet H, is attached an adjustable weight or spring, I; or, if preferred, the weight or spring may be attached to any other convenient part of the yoke or brush-holder.

Between the ends or prongs of the yoke is placed a spring, J, which is supported in this instance upon an adjusting-screw, K, by means of which the desired initial pressure of the yoke upon the friction-disk is secured, as well as the proper relation of the armature G'' to the magnets H on prong G'. Any other suitable means may be used for attaining this result; but I have found those described to be simple and effective.

The brush-holder B is secured to the yoke G by any suitable means, a pin, $b$, being shown. The coil H is shown as connected to one of the brushes by a flexible insulated wire, $c$, and to one of the binding-posts of the machine by the wire $d$, it being in this instance in the main circuit. In some instances it is preferable to make the coil of finer wire and connect it to a branch of the main circuit in a manner well understood. A dash-pot, $f$, or other retarding device may be attached to the brush-holder or other part of the apparatus, to prevent too sudden changes in the position of the brushes.

From this the operation of my governing or regulating device will be readily understood. In its inoperative condition the regulator hangs in a pendent condition from the friction-disk, as shown in Fig. 1, and with the brushes in position for taking off the maximum amount of current. As soon as the armature-shaft begins to revolve and the armature has generated a current of the desired strength or tension, the yoke, which has been carried around to some extent by the friction-disk operating against the force of gravity or a spring, assumes a position something like that shown by the dotted lines in Fig. 1, and the brushes have been moved to a position upon the armature where they will take up the desired current to be utilized in the external working-circuit. If, now, the speed of the armature varies, owing to changes in the speed of the driving-power or otherwise, a stronger current will be taken by the brushes than is desired, and as this passes to the coil H it will cause the prong G'' of the yoke to approach the bent end of G', thereby causing the yoke to grip or bind the disk F more firmly, and the friction between it and the yoke, increasing by well-known laws governing velocity and friction, will cause the yoke to move farther from the perpendicular, and, carrying the brushes around more or less toward the minimum point of the commutator, will maintain the current in the working-circuit practically uniform. So, if the condition of the current in the working-circuit is changed by any means, the strength of the attraction of the magnet H for the armature G'' will vary accordingly, and release or strengthen the pressure of the yoke upon the friction-disk, as the case may be, and thereby move the brushes upon the commutator until they are in position to take off the current desired. Thus the equilibrium of the current in the working-circuit is maintained whether variations occur in the conditions of the circuit or of the speed of the armature. It will be seen that by this arrangement but very little of the force of the current is expended in the regulation of the brushes, as it only acts in a very delicate manner to vary the friction between the disk and yoke, and the power or force necessary to move the brushes to the required position is the mechanical force that is used to propel the armature. The consequence is that the regulator acts quickly and promptly at comparatively minute variations in the current, and without wasting the electric energy or withdrawing it from the working-circuit. The electric energy is used to regulate a brake at an extended fulcrum, and the mechanical or centrifugal force of the machine does the work of moving the parts. Thus the regulation is the resultant of the two forces, as before stated.

In Fig. 3, I have shown one modification of the regulator devices, in which M is a friction-wheel on the shaft of the machine. N is a wheel bearing upon M with more or less friction, according to the current passing through the coil O, which is in the working-circuit. The wheel N is hung in a frame, P, having a fulcrum at Q. A cord or strap is carried around a drum on the same shaft as N, and is attached thereto and to the upper brush-holder. The other brush-holder may be connected to a compensating weight or spring.

It will be understood that I do not limit myself to the details of construction shown and described, as they may be varied in many ways without departing from the spirit of my invention, the gist of which consists, broadly, in controlling or regulating the current in the working-circuit by using a small portion of the energy of the circuit to control mechanical devices, and operating these devices by the same mechanical power or force used to drive the armature.

Having thus described my invention, what I claim is—

1. The combination, substantially as herein set forth, with the shaft of a revolving armature, of a brush operating and adjusting device mounted thereon and operated thereby, and means for controlling said operation depending upon the strength of the current generated.

2. The combination, substantially as herein set forth, with the shaft of a revolving armature, of a friction device mounted thereon and connected to the brush-holders, and means connected with the circuit of the machine for controlling the amount of friction in accordance with variations in the strength of the current generated.

3. The combination, substantially as herein set forth, with the shaft of a revolving armature, of a friction device mounted thereon and connected to the brush-holder, and a magnet-coil in the external circuit of the machine adapted to control the friction device in accordance with the strength of the current in said circuit.

4. The combination, with an armature-shaft of an electric generator, having a friction-disk connected thereto, of a yoke embracing said disk and connected to the brush-holder, and a magnet-coil in the external circuit of the machine controlling the pressure of said yoke on the friction-disk.

5. The combination, substantially as herein set forth, with the shaft of a revolving armature, of a friction-disk mounted thereon, a yoke surrounding the disk, means for adjusting the initial pressure of the yoke upon the disk, and a magnet in the main circuit for varying the friction in accordance with the varying strength of the current in said circuit.

6. The combination, substantially as herein set forth, of an armature having a shaft, friction-disk secured thereto, a yoke embracing said disk and having prongs or extensions, and a magnet upon one of said prongs included in the circuit of the generator, the other prong serving as an armature to said magnet.

7. The combination, substantially as herein set forth, with the shaft of an armature, of a brush-holder upon the shaft, a disk secured to said shaft, a yoke embracing said disk and having prongs or extensions, a magnet upon one of the prongs, the coil of which is included in the circuit of the generator, a screw for adjusting the initial pressure of the yoke upon the disk, and retarding devices, as set forth.

In testimony whereof I have signed my name to this specification in the presence of two subscribing witnesses.

FORÉE BAIN.

Witnesses:
W. H. FRENCH,
R. WATERMAN.